United States Patent
Russell et al.

(10) Patent No.: US 10,062,255 B1
(45) Date of Patent: Aug. 28, 2018

(54) VMD FUSED RADAR—A HYPER-VOLUMETRIC ULTRA-LOW NAR SENSOR SYSTEM

(71) Applicant: National Technology & Engineering Solutions of Sandia, LLC, Albuquerque, NM (US)

(72) Inventors: John L. Russell, Albuquerque, NM (US); Daniel E. Small, Albuquerque, NM (US); Mark W. Koch, Albuquerque, NM (US); Robert J. Anderson, Albuquerque, NM (US); Jason Jann Andersen, Albuquerque, NM (US); Katrina Groth, Washington, DC (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/810,393

(22) Filed: Nov. 13, 2017

(51) Int. Cl.
*G08B 13/00* (2006.01)
*G08B 13/196* (2006.01)
(Continued)

(52) U.S. Cl.
CPC ..... *G08B 13/19613* (2013.01); *G06K 9/6296* (2013.01); *G08B 13/19606* (2013.01);
(Continued)

(58) Field of Classification Search
CPC ........ G08B 13/19613; G08B 13/19606; G08B 13/19665; G08B 13/122; G06K 9/6296
See application file for complete search history.

(56) References Cited

U.S. PATENT DOCUMENTS

| | | | |
|---|---|---|---|
| 7,733,224 B2* | 6/2010 | Tran | G06F 19/3418 340/540 |
| 8,054,203 B2* | 11/2011 | Breed | B60C 11/24 340/931 |

(Continued)

OTHER PUBLICATIONS

W.G. Rivera; Development of a Statistically Based Access Delay Timeline; Sandia National Laboratories LDRD Annual Report Project No. 158816; 2012; 463-464.

(Continued)

*Primary Examiner* — John A Tweel, Jr.
(74) *Attorney, Agent, or Firm* — Daniel J. Jenkins

(57) ABSTRACT

A system or method for a physical intrusion detection and assessment system is provided for determining a deliberate motion intrusion. The system includes first and second sensing device to sense physical data set within a predetermined space. A transducer module receives the first sensor physical data set and the second sensor physical data set and converts the first and second physical data sets into analog signals representative of the first and second physical data sets. A signal conditioning layer converts the first and second physical data analog signals to digital signals. A processor device correlates the first physical data set and the second physical data set and generates an alarm in response to identification of an intrusion in the space. A method and algorithms are applied to the data sets for determining whether a detected intrusion is associated with deliberate motion rather than random motion.

20 Claims, 3 Drawing Sheets

(51) Int. Cl.
*G06K 9/62* (2006.01)
*G08B 13/12* (2006.01)

(52) U.S. Cl.
CPC ...... *G08B 13/19665* (2013.01); *G08B 13/122* (2013.01); *G08B 13/19695* (2013.01); *G08B 13/19697* (2013.01)

(56) References Cited

U.S. PATENT DOCUMENTS

| | | | |
|---|---|---|---|
| 9,268,938 B1* | 2/2016 | Aguayo Gonzalez | G01R 21/00 |
| 9,290,146 B2* | 3/2016 | Breed | B60R 21/01536 |
| 9,818,136 B1* | 11/2017 | Hoffberg | G06Q 30/0282 |

OTHER PUBLICATIONS

A.S. Carlin, N. Schurr, J. Marecki; ALARMS: Alerting and Reasoning Management System for Next Generation Aircraft Hazards; NASA/TP-2010-0000.

M. Koch, S. McKenna; Distributed Sensor Fusion in Water Quality Event Detection; Journal of Water Resource Planning and Management; ASCE; Jan./Feb. 2011.

D. Nikovski; Constructing Bayesian Networks for Medical Diagnosis from Incomplete and Partially Correct Statistics; IEEE Transactions on Knowledge and Data Engineering, IEEE Computer Society; 2000; 509-516; 12.

G.F. Cooper, D.H. Dash, J.D. Levander, W.K. Wong, W.R. Hogan, M.M. Wagner; Bayesian Biosurveillance if Disease Outbreaks; Proceedings of the 20th conference on Uncertainty in Artificial intelligence ; 2004, 94-103.

F. Johansson, G. Falkman; A Bayesian Network Approach to Threat Evaluation with Application to an Air Defense Scenario; 11th International Conference on Information Fusion; 2008; 1-7.

D. Small; Advanced High Security Command and Control Interface; Sandia National Laboratories LDRD Annual Report Project No. 151323; 2013; 472.

* cited by examiner

VMD Alarm Points ✖✖✖✖✖
Radar Alarm Points ○○○○○

VMD FUSED RADAR—A HYPER-VOLUMETRIC ULTRA-LOW NAR SENSOR SYSTEM

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to a system and method for physical intrusion detection. The application relates more specifically to a system and method for physical intrusion detection using fused video motion and radar sensors.

Due to recent events affecting national security interests, the issue of excessive Nuisance Alarm Rates (NAR) has surfaced as a major issue for all high security sites, e.g., power plants and critical infrastructure. Such sites may experience detection of hundreds to thousands of nuisance alarms per day. At these rates, CAS (Central Alarm Station) officers quickly become ineffective. Defense sites also experience elevated NAR because they may use the same or similar sensors. Other government agencies also encounter excessive nuisance alarm rates, as demonstrated by the sensors deployed in the failed Southern Border Initiative. What is needed is a novel sensor system that will significantly reduce nuisance alarm rates and provide reliable levels of physical intrusion detection.

Bayesian Networks have been used previously as one method for differentiating nuisance alarm sources from intruders. The Bayesian methodology provides a mechanism where prior beliefs are converted into posterior beliefs when new data becomes available. This method may be suitable for analysis of "alarm tracks" consisting of five or more alarm points. Bayesian Networks are used for decision support and diagnosis in multiple applications, including healthcare, biosurveillance, air threat detection, and sensor fusion applications.

Previous efforts to couple seismic, acoustic, magnetic, and IR sensors using a multi-level data fusion architecture, and communications links that provide filtered information to a remote operator have experienced limited success.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a physical intrusion detection and assessment system for determining a deliberate motion intrusion. The system includes a first sensing device configured to sense a first physical data set within a predetermined space and a second sensing device configured to sense a second physical data set within the predetermined space. A transducer module receives the first physical data set and the second physical data set and is configured to convert the first physical data set and the second physical data set into analog signals representative of the first physical data set and the second physical data set. A signal conditioning layer converts the first physical data set and the second physical data set analog signals to digital signals. A processor device correlates the first physical data set and the second physical data set and generates an alarm in response to identification of an intrusion in the space.

Another embodiment relates to a method for detection and assessment of data associated with a physical intrusion in a protected area comprising: sensing a first physical data set within a predetermined space; sensing a second physical data set within the predetermined space; converting the first physical data set and the second physical data set into analog signals representative of the first physical data set and the second physical data set; conditioning the first physical data set and the second physical data set analog signals to digital signals; correlating the first physical data set and the second physical data set; and generating an alarm in response to identification of an intrusion in the space.

A further embodiment discloses a non-transitory computer-readable medium including instructions that, when executed by a processor, cause the processor to perform acts comprising: receiving a first digital data set associated with sensed data derived from a video motion detector for a predetermined space; receiving a second digital data set associated with sensed data from a radar detector within the predetermined space; processing the first digital data set and the second digital data set occurring between the first boundary line and the second boundary line, using AND logic or OR logic; and identifying data in the first digital data set and the second digital data set that is indicative of a deliberate motion.

Traditional physical detection sensors possess detection envelopes that vary from one to six feet wide and generate an alarm at a single point within the respective detection envelope. An advantage of the disclosed solutions is the ability to provide larger detection envelopes that integrate volumetric sensors possessing detection envelopes as wide as a Physical Intrusion Detection and Assessment System (PIDAS), from 30 to 130 feet wide.

Another advantage is Video Motion Detection (VMD) and radar sensors, each capable of generating an "alarm-track" consisting of, e.g., 5 to 100 alarm points within a PIDAS.

Still another advantage is that the ability to detect many sample data points provides vastly superior discrimination between intruder and nuisance alarm rates sources, yet maintain reliable detection, which results in a highly reliable intrusion detection capability with an ultra-low nuisance alarm rate in excess of current Department of Energy requirements.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

What is disclosed a new class of hyper-volumetric, ultra-low NAR (Nuisance Alarm Rate) sensors. The sensors are capable of discriminating deliberate intruder motion from weather and foliage nuisance alarm rate sources. A system, as described below, fuses data from video motion detection and radar or VMD fused radar (VFR) with the following characteristics.

A nuisance alarm rate occurrence between one instance per ten days to one instance per 100 days, resulting from weather phenomenon in a PIDAS environment is achievable using the system. The system provides a probability of sense (Ps)=90% at a 95% confidence level, sensing the intruders, e.g., as defined by U.S. Department of Energy (DOE) and U.S. Department of Defense (DoD) policies. The sensor will utilize complementary phenomenologies, satisfying DOE and DoD's requirements for complementary sensors, specifically VMD and Radar do not have the same nuisance alarm sources, vulnerabilities, and will have completely overlapping detection envelopes. The sensor algorithm will be capable of processing a hybrid version of an "AND" and "OR" logic to maximize intruder detection and minimize nuisance alarm rate. This is a new approach not used by any sensors currently deployed.

Figure 1:
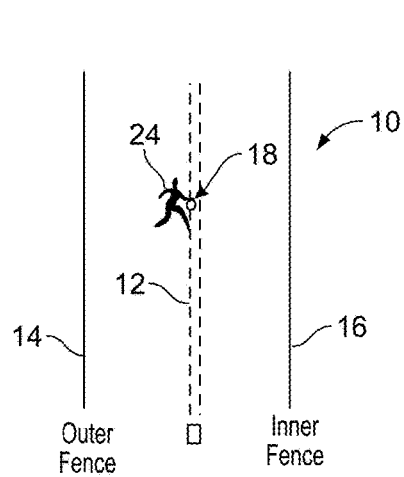
FIG. 1 shows an exemplary prior art intrusion detection system.

Referring to FIG. 1, an exemplary prior art intrusion detection system 10 is shown schematically. High security exterior sensors 12 used in physical Intrusion Detection and Assessment System 10, includes a predetermined detection envelope 12 between an outer boundary or fence, 14 and an internal boundary or fence 16. Envelope 12 may be about one to six feet wide. A detection alarm occurs at a single point 18.

Figure 2:
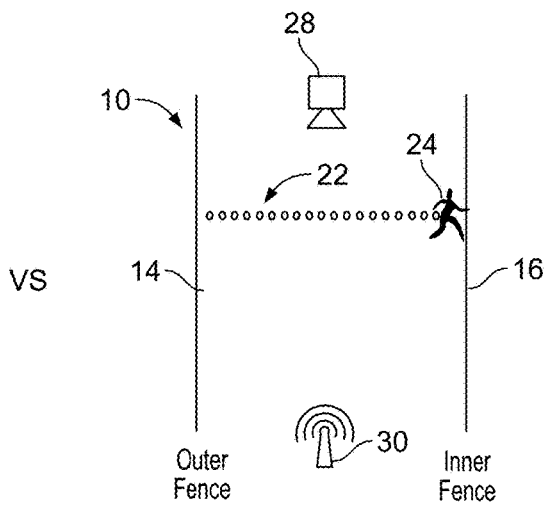
FIG. 2 shows an exemplary VMD fused radar detection system.
Figure 5:
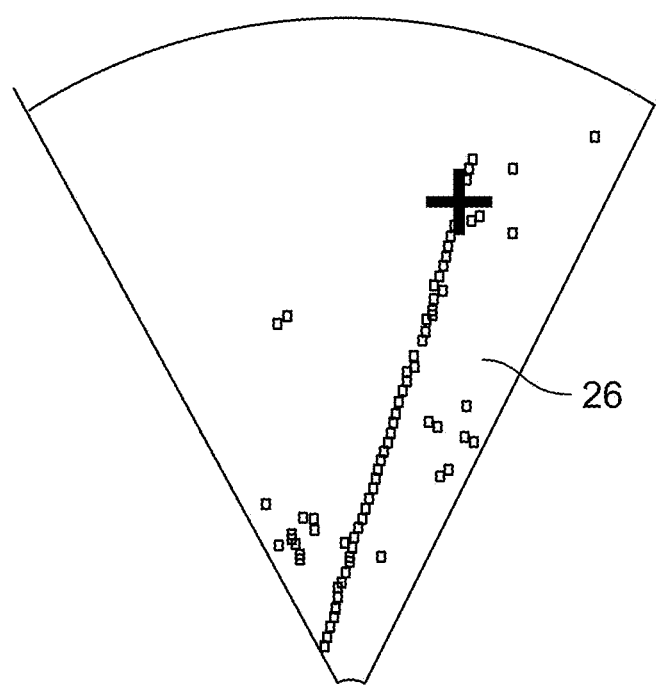
FIG. 5 shows an exemplary embodiment of video fused radar system wherein radar data indicates both deliberate motion and nuisance alarms.

Referring next to FIG. 2, by contrast, a VMD fused radar detection system 100 provides integrated volumetric sensors, possessing detection envelopes as wide as a PIDAS (Physical Intrusion Detection and Assessment System), e.g., between 30 and 130 feet wide from outer fence 14 to inner fence 16, providing a hyper-volumetric sensor. A sequence of sensor alarm points is indicated by broken line 22, as a physical intruder 24 is detected traversing the PIDAS 100. Video Motion Detection (VMD) and radar sensors may be selected that are capable of generating an alarm track consisting of between 5 and 100 alarm points within a PIDAS 100. Analysis of many detection points provides greater discrimination between, e.g., intruder 24 and nuisance alarm rate sources 26 (see FIG. 5), than the prior art narrow band detection systems, e.g., FIG. 1, while maintaining reliable detection. The result is a highly reliable intrusion detection capability with an ultra-low nuisance alarm rate in the range of 10 to 100 times better than nuisance alarm rate requirements currently set by the United States Department of Energy (DOE).

A differentiating capability of the method is the application of ultra-low nuisance alarm rate algorithm. In one embodiment a Bayesian Network may be applied to discriminate intruders 24 from nuisance alarm rate sources 26. Application of a Bayesian Network provides a mechanism where prior beliefs may be converted into posterior beliefs when new data becomes available. A Bayesian Network may be suitable for analysis of alarm signal tracking points from both radar 30 and VMD 28, consisting generally of spatially and temporally correlated alarm points. A novel feature that the algorithm provides includes a spatially applied "AND"/"OR" logic, exploiting the strengths of both "AND" and "OR" logic.

Figure 3:
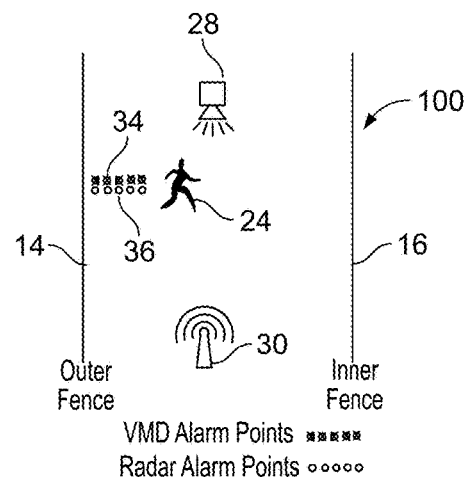
FIG. 3 illustrates an exemplary embodiment in which "AND" logic is applied to VMD output data and radar output data associated with a physical intruder in a PIDAS.
Figure 4:
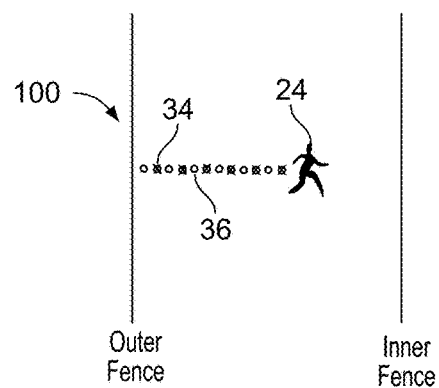
FIG. 4 illustrates an exemplary embodiment in which "OR" logic is applied to VMD output data and radar output data associated with a physical intruder in a PIDAS.

Referring next to FIG. 3 illustrates "AND" logic applied to VMD output data points 34 and radar output data traces 36, associated with a physical intruder 24 in PIDAS 100. FIG. 4 illustrates "OR" logic applied to VMD output data points 34 and radar output data traces 36 associated with a physical intruder in PIDAS 100.

The method reduces nuisance alarm rate by analyzing alarm tracks consisting of two or more alarm points 34, 36. In one embodiment the method applies a Bayesian Network algorithm and weighting functions that characterize an alarm track in time and space, as discussed in greater detail below. The weighting functions reflect the relative importance of the alarm track characteristics, e.g., number of alarm points that make up the current track, the direction of the intruder, the speed of the intruder, how many of the alarm points were reported by only the VMD 28, versus reported alarm points reported by only radar 30, and alarm points reported concurrently by both VMD 28 and radar 30. Every time an additional alarm point is reported, the new data for tracking is analyzed to determine if there is sufficient belief that the data set of alarm points is not associated with or caused by a nuisance alarm rate source.

Implementation of a spatial "AND" and "OR" logic, is a novel method for deploying sensors. By using AND logic the Bayesian Network algorithm, or other processing algorithm, enables the system to generate an alarm in response to receiving a critical number of alarm points by VMD 28 and radar 30 devices. E.g., if one sensor malfunctions and is not reporting an event that would otherwise signal an alarm condition, such alarm condition will still be initiated when an alarm track data set accumulates to a configurable number of alarm points transmitted by the second sensor.

The primary result is an Ultra-Low NAR sensing system that provides reliable detection, e.g., probability of success (Ps)>0.9 and a corresponding low nuisance alarm rate, e.g., <1/10 days independent of weather conditions.

VMD, also referred to as video analytics, receives video image data and processes the data using detection algorithms to determine if an intruder is present. There are many advantages of VMD technology because it is adaptable to technologies that can generate an image. VMD 28 may be operable upon any image data, including data from charge couple device (CCD) imagers, thermal imagers, passive millimeter wave imagers, or even sonar rastered images. The data produced by modern CCD imagers provides very high fidelity data, both spatially and temporally. For this reason, VMD sensors remain a highly desirable sensor technology when the issue of excessive nuisance alarms can be mitigated by fusing VMD data images with radar data.

In order for VMD to be used as an intrusion detection sensor, a reference image of the detection zone is generated. In one exemplary embodiment an Ioimage video motion detection platform camera, e.g., Model TRK-4000d, may be used to generate an image of a PIDAS 100. The Ioimage TRK-4000d hardware may include multiple analog cameras, and A/D decoders used to convert from digital to analog video to be compatible with Ioimage hardware.

In one embodiment the processing algorithm includes weather data so as to prevent or reduce generation of nuisance alarms when subjected to harsh weather.

Sensor data types may include, e.g., wind direction, compass direction, wind speed, miles per hour, solar irradiation, Watts per square meter, thermometer degrees Fahrenheit, % humidity inches of rain per hour, and lightning events.

Figure 6:
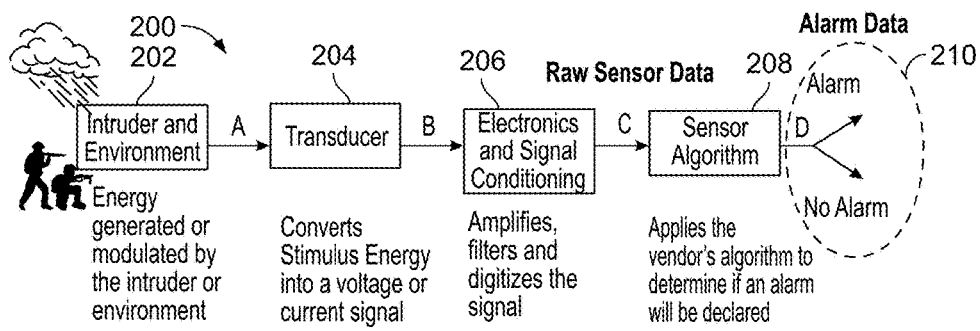
FIG. 6 shows an exemplary sensor architecture and algorithm.

Referring to FIG. 6, a sensor system architecture 200 for a two-layer deliberate motion algorithm is shown. At step 202 input data is received by system 200 in the form of energy generated or modulated, e.g., by an intruder or environmental event. From step 202 the system proceeds to step 204, in which a transducer converts input stimuli into an electronic analog signal, e.g., voltage or current signals. Signals from step 204 are received at step 206, in which signals are conditioned and digitized. From step 206 conditioned signals, or raw sensor data, are then processed by a sensor algorithm at step 208 to determine whether an alarm condition is declared. At step 210, alarm data D is provided by the sensor's algorithm. Radar alarm data includes, e.g., an indication of an alarm event, coordinates of the alarm event, and time of the event. The radar alarm data may be updated at configurable time intervals, e.g., once per second, as needed to achieve the desired reliability. The VMD sensor generates a similar set of alarm data, and is preferably updated more frequently than radar alarm data, e.g., 10 times per second.

The raw sensor data from step 208 provides an indication of the magnitude of the radar signal in every angular/range bin, which is used to generate the clutter map. In an exemplary embodiment the dimensions of the raw sensor data matrix 206 may be, e.g., 360×1024, accounting for 360 1-degree angular bins and a range bin equal to the maximum range (700 m) discretized into 210 range bins. The radar raw sensor data matrix is updated once per second. The raw sensor data for the VMD sensor is the output of the camera, which in one exemplary embodiment using a Q1604 camera by Axis Communications, updates 2 megapixels 30 times per second.

Figure 7:
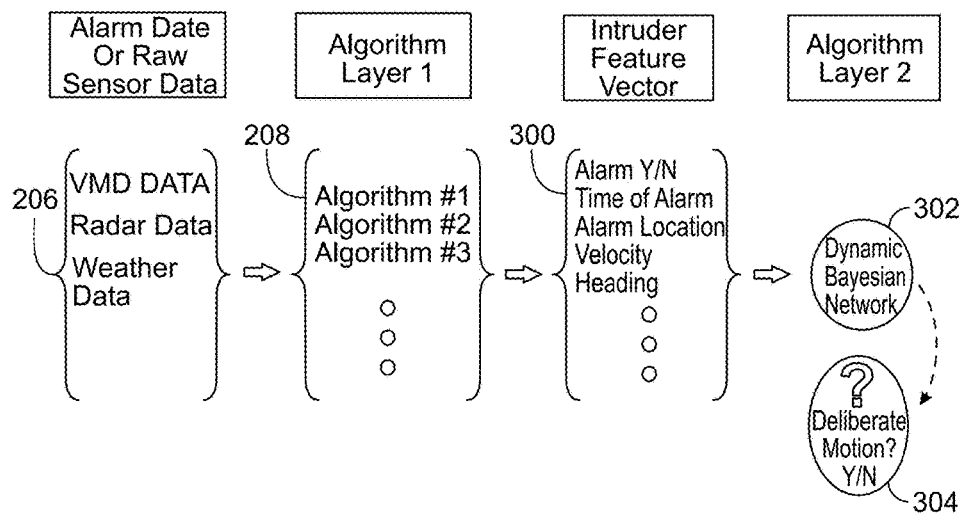
FIG. 7 shows an exemplary embodiment of a deliberate motion algorithm structure.

Referring next to FIG. 7, a two-layered algorithm based on a Dynamic Bayesian Network is shown. Raw sensor data from step 206, as described above with respect to FIG. 6, includes VMD data, radar data and weather data as processed by steps 204-206. A first algorithm layer 208 is applied to the raw sensor data, also as described above. At the output of first layer 208, the system 200 proceeds to an intruder feature vector 300. Vector 300 may include multiple data points, e.g., alarm condition (yes/no) indication, time, location coordinates, velocity, heading or direction, or other indicia associated with a trail or vector of an intruder. At step 302, a second algorithm 302 received the vector data output 300. In one embodiment the second layer algorithm 302 may be a Dynamic Bayesian Network, or DBN. The output of the DBN indicates whether there is a deliberate motion indicated by the raw sensor data 206.

As indicated in FIG. 7, a Sensor Alarm Condition may be generated as a binary (Yes/No) parameter: The first indication needed is a signal that is sufficient for the sensor to declare an alarm. In the exemplary embodiments shown, VMD and radar sensors are used in step 206, but the architecture of the algorithm allows other sensors to be used. The sensor alarm could be caused by an intruder or some other source. The algorithm is configured to differentiate an intruder from other alarm sources. The time of the alarm and alarm location are closely coupled. These two values allow the algorithm to determine if the alarm at time $t_n$ and location $x_n, y_n, z_n$ may be associated with the next alarm at $t_{n+1}$ and location $x_{n+1}, y_{n+1}, z_{n+1}$.

A human observer can easily watch the growth of an alarm track (FIG. 5) as it extends, or grows, from a single alarm point, multiple points. The growth of alarm points in adjacent range bins provides a strong indication that the sequence of alarm points is not caused by, e.g., an environmental anomaly. Associating times and location coordinates of the alarm points in an alarm track allows the computation of velocity of an intruder. Velocity can be used to filter or eliminate alarms caused by fast moving objects, e.g., debris in high winds or a bird flying through the sensor's detection envelope. Selecting a maximum velocity of an intruder crossing a PIDAS may be used to filter out debris or birds that fly through the PIDAS, e.g., velocity >16 feet per second (ft/sec.)

The creation of an alarm track indicates persistent motion of an object, but it does not imply intent. An alarm track could be caused by a wet tumbleweed being blown by the wind. The heading will suggest if the object is moving in a direction of interest, e.g., towards an asset being monitored or protected. In a PIDAS environment, an object causing an alarm track is moving towards the inner fence is a significant indicator of intent. If an object is creating an alarm track and is not moving towards the inner fence, the algorithm will not declare an alarm condition and continues to collect data associated with the intruder.

In a PIDAS environment, observing the alarm track moving towards the inner fence of a PIDAS and knowing the intruder's location and velocity provides an approximation of the arrival time of the intruder at the inner fence. This may be used for both slow- and fast-moving intrusions. For most radar systems, a slower moving target is more difficult to detect; therefore, more data points will improve detection performance. E.g., if the intruder takes 350 sec to cross the PIDAS, this allows the algorithm to collect significantly more data before making a decision to declare an alarm. In the case of a radar that scans at a rate of once per second, this would allow up to 350 data points to be collected before making a decision. In the case of a fast-moving intruder moving at 10 ft/sec in a PIDAS that is 35 feet wide, the algorithm has to make a decision in a little over 3 sec. A characteristic of radar is that a faster moving target will create a larger signal than a slower moving target. This results in a larger signal to noise ratio from the sensor and increases the probability of detecting the intruder. For both fast- and slow-moving intruder conditions, the ETA allows the algorithm to optimize the data collection time before it needs to make a decision.

As the intruder gets closer to the inner fence, the algorithm will raise the importance of that intrusion. This feature is closely coupled with the previous feature discussed, ETA.

Monte Carlo simulations form a clutter probability distribution for a given size of clusters, k, relative to a space-time volume, V. The Kulldorff scanning algorithm also specifies a particular method for scanning spatial and spatio-temporal data distributed over extended regions. In this study, scanning was implemented in a threading engine that searches regions for volumes holding statistically significant clusters. The clusters discovered by the threading engine are then compared to the background clutter model to estimate their statistical significance.

Alternative detection algorithms may be substituted including, by way of non-limiting example, Kalman Filters, Particle Filters, Multi-Hypothesis Tracking, Deliberate Motion MHT Algorithm, DBNs and Probabilistic Knowledge-Based Systems, and combinations thereof.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

The present application contemplates methods, systems and program products on any machine-readable non-transitory media for accomplishing its operations. The embodiments of the present application may be implemented using an existing computer processors, or by a special purpose computer processor for an appropriate system, incorporated for this or another purpose or by a hardwired system.

It is important to note that the construction and arrangement of the intrusion detection system and method as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, DRAM, SRAM, DRDRAM, ROM, EPROM, EEPROM, CD-ROM or other optical disk storage, magnetic disk storage or other magnetic storage devices, or any other non-transitory computer-readable medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A physical intrusion detection and assessment system for determining a deliberate motion intrusion, the system comprising:
   a first sensing device configured to sense a first physical data set within a predetermined space; a second sensing device configured to sense a second physical data set within the predetermined space;
   a transducer module to receive the first physical data set and the second physical data set; the transducer module configured to convert the first physical data set and the second physical data set into analog signals representative of the first physical data set and the second physical data set;
   a signal conditioning layer configured to convert the first physical data set and the second physical data set analog signals to digital signals; and
   a processor device configured to execute an algorithm, wherein the algorithm correlates the first physical data set and the second physical data set and generates an alarm in response to identification of an intrusion in the space.

2. The system of claim 1, wherein the first sensing device is a video motion detection device and the first physical data set comprises video data.

3. The system of claim 1, wherein the second sensing device is a radar device and the second physical data set comprises radar data.

4. The system of claim 1, wherein the space comprises a first boundary line and a second boundary line, the first boundary line and a second boundary line separated by a predetermined distance; the first boundary line representing an initial intrusion detection point and a second boundary line indicating an exit boundary corresponding to a protected entity.

5. The system of claim 4, wherein the first physical data set and the second physical data set occurring between the first boundary line and the second boundary line, are processed by AND logic to identify concurrent data in the first physical data set and the second physical data set that is indicative of a deliberate motion.

6. The system of claim 4, wherein the first physical data set and the second physical data set occurring between the first boundary line and the second boundary line, are processed by OR logic to identify data in the first physical data set and the second physical data set that is indicative of a deliberate motion.

7. The system of claim 4, wherein the algorithm further comprises:
a second layer algorithm,
wherein the second layer algorithm receives digital data associated with the first physical data set and the second physical data set, and applies a dynamic Bayesian network to determine whether the alarm condition represents a deliberate motion directed towards the second boundary line.

8. The system of claim 7, wherein the digital data includes video motion data, radar data and weather data.

9. The system of claim 1, wherein the algorithm comprises:
a first layer algorithm and a second layer algorithm; the first layer algorithm comprising at least one of a Kalman Filter, Particle Filter, Multi-Hypothesis Tracking, Deliberate Motion MHT Algorithm, Probabilistic Knowledge-Based System, and combinations thereof;
and the second layer algorithm comprising a Dynamic Bayesian Network; wherein the first layer algorithm receives digital data associated with the first physical data set and the second physical data set and generates an intrusion feature vector data set;
wherein the second layer algorithm received the intrusion feature vector data set and generates an alarm in response to a positive indication of a deliberate motion in the intrusion feature vector data set.

10. The system of claim 9, wherein the intrusion feature vector data set comprises an alarm condition output from the first layer algorithm; a time associated with each data point in the respective first or second physical data set, a velocity vector, and a direction.

11. A method for detection and assessment of data associated with a physical intrusion in a protected area comprising:
sensing a first physical data set within a predetermined space; sensing a second physical data set within the predetermined space;
converting the first physical data set and the second physical data set into analog signals representative of the first physical data set and the second physical data set;
conditioning the first physical data set and the second physical data set analog signals to digital signals;
correlating the first physical data set and the second physical data set; and
generating an alarm in response to identification of an intrusion in the space.

12. The method of claim 11, further comprising:
providing a video motion detection device to generate the first physical data set and
providing a radar device to generate the second physical data;
wherein the first physical data set comprises video motion data and the second physical data set comprises radar data.

13. The method of claim 11, further comprising:
defining a first boundary line and a second boundary line separated by a predetermined distance; the first boundary line representing an initial intrusion detection point and a second boundary line indicating an exit boundary corresponding to a protected entity.

14. The method of claim 13, further comprising
processing the first physical data set and the second physical data set occurring between the first boundary line and the second boundary line, using AND logic; and
identifying concurrent data in the first physical data set and the second physical data set that is indicative of a deliberate motion.

15. The method of claim 13, further comprising
processing the first physical data set and the second physical data set occurring between the first boundary line and the second boundary line using OR logic; and
identifying data in the first physical data set and the second physical data set that is indicative of a deliberate motion.

16. The method of claim 13, further comprising:
receiving the digital data associated with the first physical data set and the second physical data set,
applying a dynamic Bayesian network; and
determining whether the alarm condition represents a deliberate motion directed towards the second boundary line.

17. The method of claim 16, further comprising generating the digital data using at least one of a Kalman Filter, Particle Filter, Multi-Hypothesis Tracking, Deliberate Motion MHT Algorithm, Probabilistic Knowledge-Based System, and combinations thereof.

18. The method of claim 16, further comprising receiving digital data associated with the first physical data set and the second physical data set and generating an intrusion feature vector data set.

19. The method of claim 18, further comprising receiving the intrusion feature vector data set generating an alarm in response to a positive indication of a deliberate motion in the intrusion feature vector data set.

20. A non-transitory computer-readable medium comprising instructions that, when executed by a processor, cause the processor to perform acts comprising:
receiving a first digital data set associated with sensed data derived from a video motion detector for a predetermined space;
receiving a second digital data set associated with sensed data from a radar detector within the predetermined space;
processing the first digital data set and the second digital data set occurring between the first boundary line and the second boundary line, using AND logic or OR logic; and
identifying data in the first digital data set and the second digital data set that is indicative of a deliberate motion.

* * * * *